Aug. 24, 1948.    G. A. LYON    2,447,516
WHEEL COVER
Filed April 10, 1944
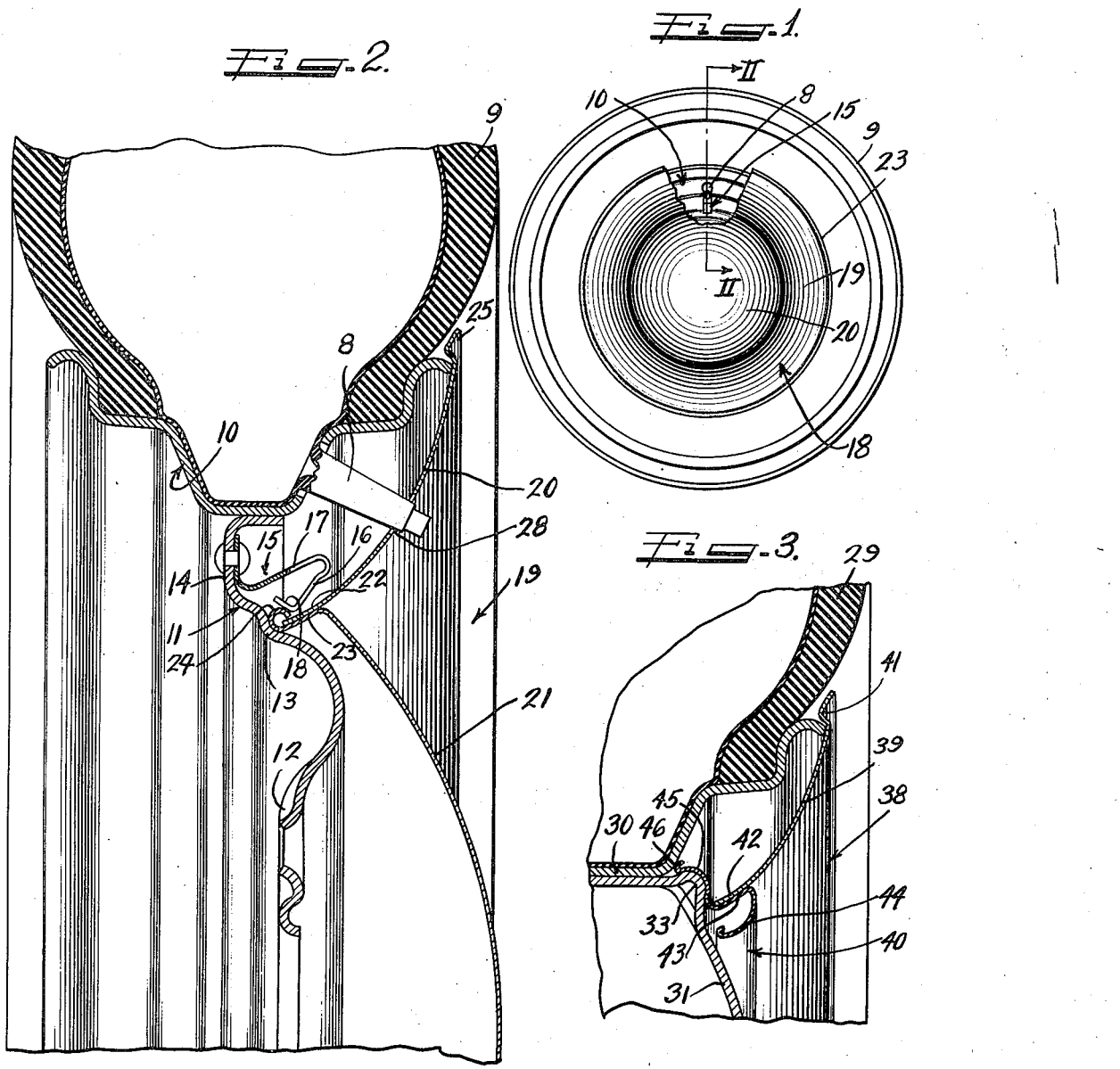
Inventor
GEORGE ALBERT LYON.

Patented Aug. 24, 1948

2,447,516

UNITED STATES PATENT OFFICE 2,447,516

WHEEL COVER

George Albert Lyon, Allenhurst, N. J.

Application April 10, 1944, Serial No. 530,354

9 Claims. (Cl. 301—37)

This invention relates to a wheel structure and more particularly to a novel wheel cover or trim and the retention of the same on the wheel.

An object of this invention is to provide a simple form of cover wherein a multiple of parts are secured together in a simple but effective manner.

Still another object of this invention is to provide a multiple part wheel trim wherein the junction between the parts is utilized in the retention of the cover on the wheel.

A further object of the invention relates to the provision of a wheel trim wherein at least one of the parts may, if it is so desired, be made of plastic and wherein the plastic characteristics of the part may be utilized to advantage in the use of the cover.

In accordance with the general features of this invention there is provided in a wheel structure including multiflange tire rim and body parts a wheel trim cooperable therewith comprising a multiple of nested parts joined together on an inclined plane and wherein there is provided at the junction a shoulder means cooperable with means on the wheel for retaining the trim on the wheel.

In accordance with still other features of the invention, a wheel trim or cover of the foregoing characteristics may embody a central portion which may be either in the form of a hub cap or an annulus without deviating from the principles of the invention.

Yet another feature of the invention relates to the formation of a cover in such a manner that at the junction of the parts thereof there is not only provided a shoulder for retaining cooperation with the wheel but in addition thereto the shoulder is so located that it may be backed up by a shoulder portion of the wheel.

Other objects and features of this invention will more fully appear from the following detailed description taken in connection with the accompanying drawings which illustrate several embodiments thereof and in which Figure 1 is a side elevation of a wheel structure embodying one form of the invention and wherein the wheel trim or cover is partly broken away to show the location of the retaining means;

Figure 2 is an enlarged fragmentary cross-sectional view taken on the line II—II of Figure 1, looking in the direction indicated by the arrows and showing clearly the manner in which the cover parts are joined together and how the cover is retained on the wheel at the joint between the parts; and Figure 3 is a fragmentary cross-sectional view similar to Figure 2 but illustrating a modified form of the invention wherein the central part of the cover is in the form of an annulus instead of in the form of a hub cap.

As shown on the drawings:

The reference character 9 designates generally a conventional type of pneumatic tire having the usual tube equipped with a valve stem 8 and carried by the conventional drop center multiflange tire rim part 10.

This part 10 of the wheel is secured in any suitable manner to a central wheel body part or spider 11 which, as is well known in the art, may comprise a metallic stamping. The part 11 has the usual central bolt-on flange 12 by means of which the wheel may be secured by bolts or cap screws (not shown) to a suitable part on an axle such, for example, as a brake drum or the like. The body part 11 also has a shoulder portion 13 adjacent the tire rim part 10 which is adapted to define a seat for the cover of my invention to be described hereinafter. In addition, the body part 11 has a depressed section 14 adjacent the base flange of the rim part in which a plurality of cover retaining spring clips 15 are fastened. These clips 15 are all identical in number and may be of any desirable number such, for example, as four. Each of the clips is secured to the depressed or channeled section 14 of the body part by any suitable means such, for example, as riveting or the like. Also, each clip includes a gooseneck portion 17 having a freely flexible inclined leg 16 terminating in a shouldered extremity 18. The shouldered extremities 18 of the clips 15 are all arranged in a common circle so as to be engaged by a shoulder on my wheel trim or cover to be hereinafter described.

The wheel cover of my invention shown in Figures 1 and 2 is designated generally by the reference character 19 and includes an outer annular section or portion 20 and a central circular portion or hub cap 21. These two parts or portions of the cover are joined together on an intermediate inclined plane. In other words, the inner margin of the trim section 20 is inclined at 22 and this inclined inner marginal portion 22 is adapted to tightly nest on the correspondingly inclined margin 23 of the hub cap 21. The inclination is such that it extends axially rearwardly and radially inwardly. The inclined portion 23 of the hub cap 21 terminates in a curled edge 24 into which the inner extremity of the inclined margin 22 of the portion 20 is adapted to be retained.

Also it should be noted that the trim section 20 is of a concave-convex configuration and is of such radial depth as to completely conceal the outer side flanges of the rim part 10. This is accomplished by having the outer extremity of the trim section 20 project beyond the outer edge of the rim. I find that a desirable effect may be accomplished by having the outer edge of the section 20 offset rearwardly as indicated at 25 so as to overhang the outer edge of the tire rim 10. It will be perceived from Figure 2 that this brings the outer periphery of the annular section 20 in close proximity to the side wall of the tire. By so doing it is possible to cause the trim section 20 to appear to be a continuation of the side wall of the tire, and this is particularly true if the external surface of this section 20 is given a suitable finish so as to cause it to appear to be a wall portion of the tire such, for example, as a white side wall portion. When mounted on the wheel the section 20 of the cover appears to blend in with the tire so as to cause the tire to have a massive appearance and to appear to extend clear down to the hub cap 21. The hub cap 21 may, if it is so desired, be given a highly lustrous finish on its external surface so as to afford a desirable contrasting color effect.

While the parts or sections 20 and 21 of the cover may be made of any suitable material, I find that very desirable results may be obtained by making the section 20 of a resiliently flexible plastic such, for example, as ethyl cellulose. Such a plastic has the property of being able to retain its shape even though it is slightly indented or temporarily manually deflected. Moreover, by making the section 20 of plastic I find that the assembly of the two cover sections is greatly facilitated since the inner margin of the section 20 may be readily snapped over and into nested cooperation with the outer margin of the hub cap portion 21.

In the application of the cover to the tire it is first lined up with the valve stem 8 so that the valve stem 8 can project through a hole 28 formed in the trim section 20 of the cover. Then the cover is pressed axially, which results in the free legs 16 of the spring clips being sprung outwardly to an extent to permit the curled edge or shoulder 24 of the cover to pass over the humped extremities 18 of the clips. In other words, the shouldered curled edge 24 of the cover is pressed over and behind the humped extremities of the clips. This results in the extremities of the clips through the resiliency of these clips forcing the curled edge 24 of the cover tightly against the shoulder 13 on the wheel body part thereby insuring a tight retention of the cover on the wheel. The clips may, of course, be made of any suitable material but I find it desirable to make them of spring steel so that they have the requisite resiliency necessary for exerting the required spring pressure on the cover.

In removing the cover the outer edge of the section 20 may be engaged either manually or by a tool and the cover forcibly pried off of the spring clips 15. A suitable pry-off tool, such as a screwdriver, can be inserted behind the trim section and a pry-off force may then be applied directly to the turned edge or shoulder 24.

I further desire to call attention to the fact that by reason of the resilient properties of the trim portion 20, it is possible to flex the same without permanently distorting it. For example, should it be desirable to get to the rear side of the portion 20, the same may be effected by pulling on the outer edge of the portion 20 to an extent sufficient to enable access to the rear thereof. This is sometimes necessary as where it becomes important to adjust wheel balancing weights which might have to be carried by the tire rim part of the wheel.

In Figure 3 I have illustrated a modification of the invention wherein the cover instead of embodying a central hub cap, embodies an annular ring. It should be noted in this regard that it is not necessary that the central part be of such radial extent as to cover or conceal the entire center of the wheel. This is true of both forms of the invention. However, when a central ring, such as that shown in Figure 3, is used, then a separate hub cap will have to be employed in the usual manner for concealing the central wheel bolts used in fastening the wheel to the brake drum.

In the modification shown in Figure 3 the tire is designated generally by the reference character 29 and is carried by the usual drop center type of tire rim 30 attached in any suitable manner to a wheel body part 31. The wheel body part 31 has adjacent the base flange of the tire rim part, protuberance or shoulder means 33 which is adapted to cooperate in the retention of the cover. The cover of my invention is designated generally by the reference character 38 and embraces an outer annular plastic section 39 and a central metal annular bead portion or part 40. These two parts have cooperating inclined portions 42 and 43 adapted to be nested one within the other so that the portion 39 is carried by the bead 40. The bead 40 also has a curved hollow inner portion 44 which may have a lustrous finish to provide the trim portion 39 with the appearance of having an ornamental bead on its inner periphery.

The bead part 40 of the cover also has an integral portion thereof an annular resilient channeled portion 45 adapted to be resiliently sprung over and around the shoulder portion 33 of the wheel for the purpose of retaining the wheel cover or trim on the wheel. The channeled portion 45 terminates in a turned edge 46 adapted to tightly seat against a side flange of the tire rim part at the junction of the two wheel parts 30 and 31.

If it is so desired the trim portion 39 of the cover may be made of any suitable resilient plastic material such, for example, as ethyl cellulose, and is flexible in much the same manner as the previously described trim portion of the first form of the invention.

The application of this trim to and its removal from the wheel is substantially the same as described in connection with the first form of the invention, the principal difference being that instead of applying the trim to spring clips, the trim is pressed over protuberance means 33. It should be noted that the protuberance means 33 may be either in the form of spaced bumps or in the form of a continuous rib.

I claim as my invention:

1. As an article of manufacture, a wheel cover comprising a multiple of concentric and nested circular portions each having surfaces inclined relative to the vertical and adapted to interfit for establishing a joint between the portions whereby they are held together as a unitary device, there being provided at said junction shoulder means for retaining cooperation with a wheel, one of said portions comprising a plastic annulus adapted to be flexed over the inclined surface of the other portion in the attaching of the two portions together.

2. As an article of manufacture, a wheel cover comprising a multiple of concentric and nested circular portions each having surfaces inclined relative to the vertical and adapted to interfit for establishing a joint between the portions whereby they are held together as a unitary device, there being provided at said junction shoulder means for retaining cooperation with a wheel, one of said portions comprising a plastic annulus adapted to be flexed over the inclined surface of the other portion in the attaching of the two portions together, the other portion comprising a metal inner ring including a reinforcing annular bead at the inner extremity of the plastic portion and a rearwardly projecting shoulder for retaining cooperation with the wheel.

3. In a wheel structure, a wheel including a multi-flanged tire receiving rim part including a base flange, an axially outwardly bulging load bearing body part attached to said base flange and having an axial indentation adjacent and directly radially inward of the base flange of the rim part and at the radially outer side of the body bulge, and cover retaining means on at least one of said wheel parts and a cover including an annular portion for substantially concealing exposed flanges of said rim part and extending axially and radially inward from an outer edge of the rim part, said cover extending into said indentation to a point adjacent the medial plane of the tire and wheel.

4. In a wheel structure, a wheel including a multi-flanged tire receiving rim part including a base flange, an axially outwardly bulging load bearing body part attached to said base flange and having an axial indentation adjacent and directly radially inward of the base flange of the rim part and at the radially outer side of the body bulge, and cover retaining means on at least one of said wheel parts facing radially inwardly, a cover including an annular portion for substantially concealing exposed flanges of said rim part and extending axially and radially inward from an outer edge of the rim part to a point adjacent the medial plane of the tire and wheel and a hub cap cooperating with said annular portion and with said cover retaining means in said identation.

5. In a wheel structure, a wheel including a multi-flanged tire receiving rim part including a base flange, an axially outwardly bulging load bearing body part attached to said base flange and having an axial indentation adjacent and directly radially inward of the base flange of the rim part and at the radially outer side of the body bulge, and cover retaining means on at least one of said wheel parts and a cover including an annular portion for substantially concealing exposed flanges of said rim part and extending axially and radially inward from an outer edge of the rim part, said cover extending into said indentation to a point adjacent the medial plane of the tire and wheel, said annular cover portion having a curved cross-sectional contour such that said portion, in use, appears to constitute a continuation of the curved side wall of the tire and to extend clear into said indentation.

6. As an article of manufacture, a wheel cover comprising a multiple of concentric and nested circular members having respective interfitting portions divergently related to the axis of the cover, one of said cover members being resiliently flexible and adapted to be drawn axially into said nested relationship whereby the divergent portion thereof flexes into engagement with the divergent portion of the companion cover member, said companion cover member having means thereon opposing the edge of the flexible divergent portion of said one cover member at the inner periphery of the divergent portions to resist axial disassembly movement of the flexible divergent portion relative to the divergent surface of said companion cover member, said means providing shoulder structure for retaining cooperation with a wheel in mounting the cover thereon.

7. As an article of manufacture, a wheel cover comprising a multiple of concentric and nested circular portions each having surfaces inclined relative to the axis of the cover and adapted to interfit for establishing a joint between the portions whereby they are held together as a unitary device, there being provided at said junction means for retaining cooperation with the wheel, one of said cover portions comprising a plastic annulus adapted to be flexed over the inclined surface of the other cover portion in the assembling of the two portions together.

8. In a wheel structure including a wheel having multiflange tire rim and body parts, a wheel cover cooperable therewith comprising a plurality of circular concentric divergent portions joined together by nested inclined extremities on both of the portions disposed in a radially and axially outward inclined plane relative to the axis of the cover, one of said portions comprising a plastic annulus flexible at its inclined extremity and stretchable into assembly with the cooperating inclined extremity of the other portion.

9. In combination in a cover for a vehicle wheel, a hub-cap-simulating portion having a marginal flange inclined axially inwardly, radially inwardly, said inclined flange having an outturned bead thereon, and a radially outwardly extending resiliently flexible plastic annulus assembled with said hub-cap-simulating portion and having its inner margin extending complementary to and of its own resilience tightly encircling said inclined flange, said inner margin of said annulus being radially stretchable for assembly with the hub-cap-simulating portion by relative axial movement of the annulus and hub cap simulating portion whereby said bead is forced through the ring of the inner margin of the annulus and the latter stretches thereover and snaps into engagement with said inclined flange, said bead opposing the inner end of said annulus to prevent axial separation of the annulus and hub cap simulating portion which might otherwise result from axial rearward slipping off of the resilient annulus margin from said inclined flange.

GEORGE ALBERT LYON.

REFERENCES CITED

The following references are of record in the file of this patent:

UNITED STATES PATENTS

| Number | Name | Date |
| --- | --- | --- |
| 1,234,387 | Pugh et al. | July 24, 1917 |
| 2,139,900 | Lyon | Dec. 13, 1938 |
| 2,190,669 | Lyon | Feb. 20, 1940 |
| 2,193,104 | Lyon | Mar. 12, 1940 |
| 2,298,669 | Wood | Oct. 13, 1942 |